(12) United States Patent
Cotignola et al.

(10) Patent No.: US 9,124,690 B2
(45) Date of Patent: Sep. 1, 2015

(54) OBTAINING FROM A NETWORK MEDIA RELATED TO AN INCOMING CALL BASED ON RECORDS OF A DATA RELAY DEVICE

(75) Inventors: Christopher J. Cotignola, Doylestown, PA (US); Jacob Igval, Newtown, PA (US); Dipak R. Patel, Hatboro, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 1371 days.

(21) Appl. No.: 12/209,833

(22) Filed: Sep. 12, 2008

(65) Prior Publication Data
US 2010/0067671 A1 Mar. 18, 2010

(51) Int. Cl.
| | | |
|---|---|---|
| H04M 11/00 | (2006.01) | |
| H04M 3/42 | (2006.01) | |
| H04M 3/02 | (2006.01) | |
| H04M 11/06 | (2006.01) | |
| H04W 4/16 | (2009.01) | |
| H04L 29/06 | (2006.01) | |

(52) U.S. Cl.
CPC ............ *H04M 3/42068* (2013.01); *H04M 3/02* (2013.01); *H04L 65/1059* (2013.01); *H04M 11/066* (2013.01); *H04W 4/16* (2013.01)

(58) Field of Classification Search
USPC ............................ 379/93.17, 201.01; 370/389
See application file for complete search history.

(56) References Cited

U.S. PATENT DOCUMENTS

| | | | |
|---|---|---|---|
| 6,711,239 B1 | 3/2004 | Borland | |
| 7,010,002 B2 | 3/2006 | Chow et al. | |
| 7,725,100 B2* | 5/2010 | Maddox | 455/414.1 |
| 2003/0231749 A1* | 12/2003 | Ansley et al. | 379/93.17 |
| 2004/0228476 A1* | 11/2004 | Denninghoff | 379/428.02 |
| 2005/0180554 A1 | 8/2005 | Alston et al. | |
| 2006/0084471 A1 | 4/2006 | Walter | |
| 2007/0002856 A1* | 1/2007 | Aoyama et al. | 370/389 |
| 2007/0264978 A1* | 11/2007 | Stoops | 455/414.1 |
| 2008/0080690 A1* | 4/2008 | Burns | 379/201.01 |
| 2009/0154670 A1 | 6/2009 | Cotignola et al. | |
| 2009/0190742 A1* | 7/2009 | Freeman et al. | 379/265.09 |

OTHER PUBLICATIONS

International Patent Office, International Search Report in International Patent Application No. PCT/US2008/086121 (Jan. 22, 2009) 1 page.

* cited by examiner

*Primary Examiner* — Maria El-Zoobi
(74) *Attorney, Agent, or Firm* — Leydig, Voit & Mayer, Ltd.

(57) ABSTRACT

A data relay device comprises a modem, an adaptor, and a base station. The base station is configured to determine whether an incoming call has a corresponding record among one or more records of the data relay device, obtain media by using the corresponding record, and transmit the media to a customer premise equipment device.

13 Claims, 4 Drawing Sheets

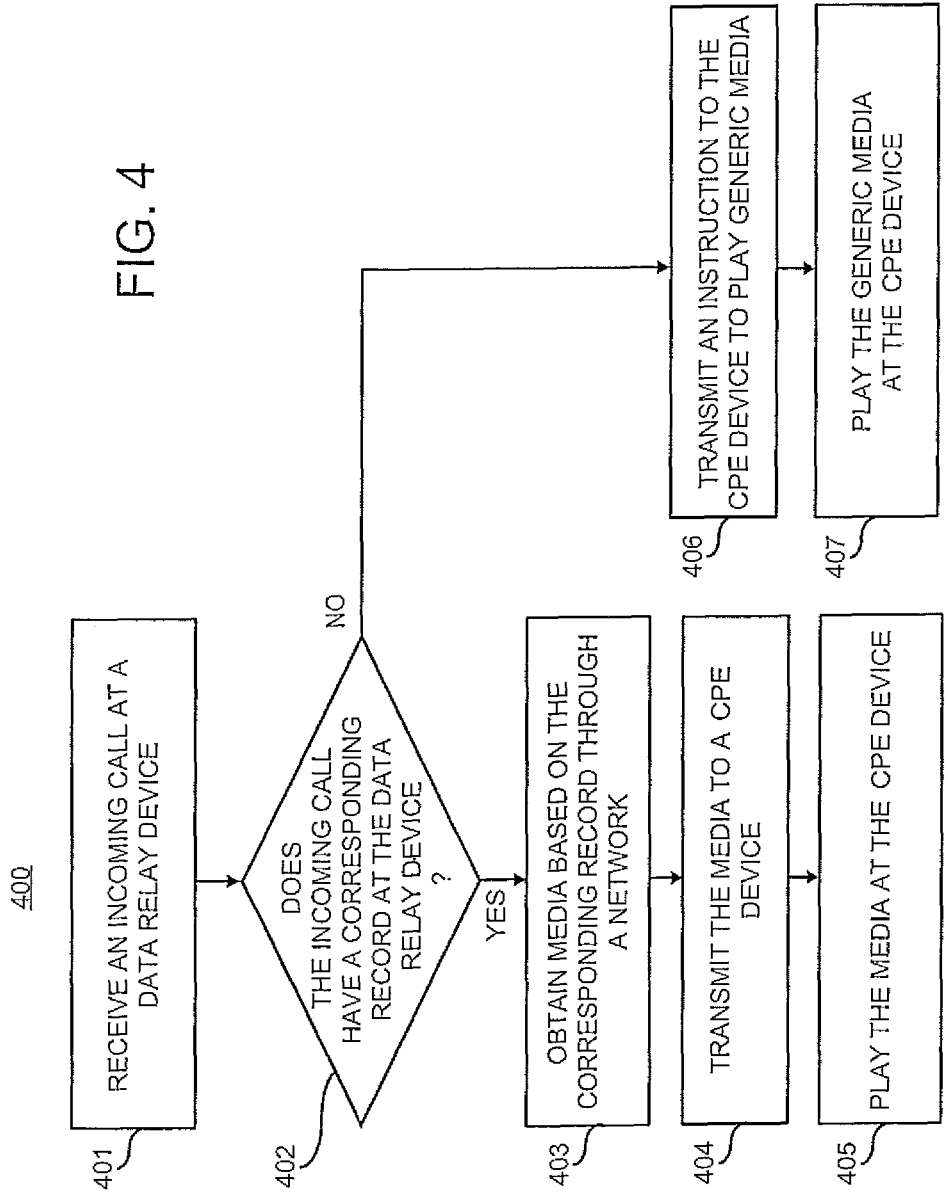

OBTAINING FROM A NETWORK MEDIA RELATED TO AN INCOMING CALL BASED ON RECORDS OF A DATA RELAY DEVICE

CROSS-REFERENCES

This application is related to copending and commonly assigned Non-Provisional U.S. patent application Ser. No. 11/957,003, entitled "PROVIDING ADVANCED CALLING FEATURES FROM A MULTIMEDIA TERMINAL ADAPTOR," filed by the same inventors to this instant patent application on Dec. 14, 2007, the disclosure of which is hereby incorporated by reference in its entirety.

BACKGROUND

While ring signals to generate generic ring tones have been available in embedded multimedia terminal adaptors (EMTAs) to inform telephone users of incoming calls, ring signals to generate customized ring tones to distinguish different callers have not been made available in EMTAs.

In explaining the background of the foregoing deficiency, an EMTA is a combination of a modem and a multimedia terminal adaptor (MTA), where the term "MTA" refers to a Voice-over-Internet-Protocol (VoIP) device and is used interchangeably with an analog terminal adaptor (ATA). As referred to in this disclosure, a modem may be any reasonably suitable modem for receiving data such as a cable modem, digital subscriber line (DSL) modem, etc. VoIP devices enable users to make and receive telephone calls via a VoIP network such as the Internet by connecting portable VoIP devices to the VoIP network via wires or wirelessly, where each VoIP device may operate as an interface between a telephone and a VoIP network.

At a customer premise, an EMTA has been typically connected to a local loop, where the EMTA sends out signals to cause a telephone to generate generic rings to inform users of incoming calls. A local loop may comprise a twisted-pair of RJ-11 wiring, which is a telephone wiring commonly provided in homes and businesses. For example, with the RJ-11 wiring, an EMTA generally provides an alternating voltage between tip and ring wires on the RJ-11, where such a signal causes a phone to activate its ringer. While ring signals may be modified by using different duty cycles (the on-off timing bursts) and different overall cadence in bursts of voltages, such ring signals have been produced generically for all callers and are meant to merely to inform users of incoming calls without distinguishing between different callers. For instance, while different duty cycles of ring signals may cause a phone connected to the RJ-11 to ring for three seconds and then stop for one second and ring for two seconds and stop for one second, such ring signals generated by EMTAs are not known to have produced different ring tones for different callers.

This is unfortunate in that while the wireless, mobile phone market has captured revenues from users wanting different ring tones to distinguish different callers, similar features have not been made available in EMTAs.

BRIEF DESCRIPTION OF THE DRAWINGS

The embodiments of the invention will be described in detail in the following description with reference to the following figures.

FIG. 4 illustrates a flow-chart of a method for obtaining, from a network, media related to an incoming call, according to an embodiment of the invention.

DETAILED DESCRIPTION

Figure 1:
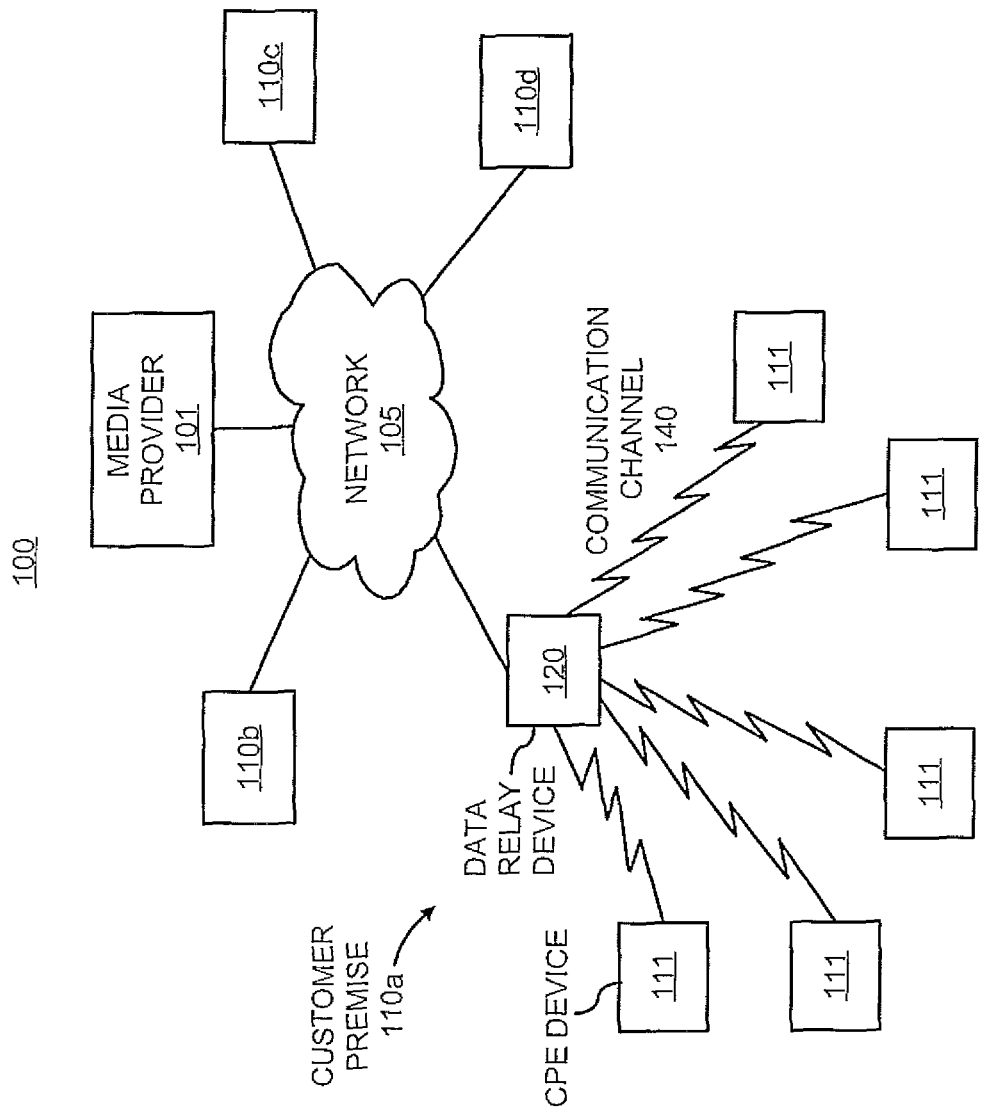
FIG. 1 illustrates a system for providing ring tones from one or more media providers for being played by an appropriate CPE device of a customer premise to inform users of incoming calls, according to an embodiment of the invention.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As referred to in this disclosure, a VoIP device may be any reasonably suitable adaptor such as an ATA, MTA, etc., that converts audio signals received from an audio port to data packets by at least adding header fields for outputting the converted data packets to a data packet port and converts data packets received from the data packet port to audio signals by at least stripping header fields from the data packets for outputting the converted audio signals to the audio port. An MTA may be combined with a modem to form an EMTA, and the EMTA in turn may be combined with a cordless base station, where the base station is used to send data received by the EMTA to a customer premise equipment (CPE) device such as a telephone, fax machine, a computer, a voice answering machine, etc., over one or more wireless communication channels.

As referred to in this disclosure, data packets each comprise a header field and a data field, where the header fields are used for processing data packets and may each include at least one of a source Internet protocol (IP) address, a destination IP address, a time, and any other data related to processing of data packets including cyclic redundancy check (CRC) bits.

In describing use of a combination of an EMTA and a cordless base station more specifically, the base station is used in communicating data received by the EMTAs to CPE devices by, for instance, using a wireless, digital communication method known as a Digital Enhanced Cordless Telecommunications ("DECT") standard. DECT is an ETSI standard for digital, portable phones such as the 2.8 GHZ cordless telephones, the 5.8 GHZ cordless telephones, etc., that are commonly used for domestic or corporate purposes.

According an embodiment, when an incoming call arrives at a data relay device such as a combination of an EMTA and a base station, a caller identification may also be received. The caller identification may be compared to records of callers stored in the data relay device, and if there is a match, the data relay device obtains from the matching record information as to a ring tone to be played by an appropriate CPE device for the incoming call. The data relay device obtains the ring tone from a network and sends the ring tone over a wireless communication channel to the appropriate CPE device, which in turn play the ring tone to notify a user of the incoming call and distinguish between different callers.

By using the data relay device's connection to a network such as the Internet and a local area network (LAN), customized ring tones for different callers as stored in media providers on the network are obtained by the data relay device and transmitted to an appropriate CPE device without necessarily having the ring tones stored at the data relay device or the CPE device. Thus, the data relay device and CPE device may be kept simple and economical by avoiding storage of customized ring tones on the devices themselves.

FIG. 1 illustrates a system 100 for providing ring tones from one or more media providers 101 for being played by appropriate CPE devices 111 of customer premises 110a-d to inform users of incoming calls, according to an embodiment. It should be understood that the system 100 may include additional components and that some of the components described herein may be removed and/or modified without departing from a scope of the system 100. While embodiments are described in relation to obtaining, relaying, and playing ring tones, the same description covers and extends to obtaining, relaying, and playing any reasonably suitable media such as a ring tone, a video clip, an audio clip, a picture, etc.

The system 100 includes one or more media providers 101, the network 105, and the customer premises 110a-d. While only the customer premise 110a is shown to have a data relay device 120, the CPE devices 111, and a communication channel 140, each of the customer premises 110b-d may also include the same components.

Each media provider 101 may be any reasonably suitable device connected to the network 105 for storing ring tones that may be provided to appropriate CPE devices 111 of call-receiving customer premises such as a content server of a website, a computer on a local area network (LAN), a central data storage, etc.

The network 105 may be any reasonably suitable network for connecting calls between the customer premises 110a-d and/or providing ring tones from the one or more media providers 101 to call-receiving customer premises 110a-d. For example, the network 105 may comprise one or more packet-switched networks such as the Internet, one or more local area networks (LANs), and/or one or more public switched telephone networks (PSTNs).

The data relay device 120 of each customer premise may be any reasonably suitable device for relaying information to and from respective CPE devices 111 of the customer premise such as an EMTA, a combination of an EMTA and a base station, etc. The data relay device 120 of each customer premise may be connected to respective CPE devices 111 of the customer premise through the respective communication channel 140 of the customer premise, where the communication channel 140 of the customer premise may be formed of one or more communication channels based on any reasonably suitable way of forming a communication channel such as the DECT standard, another cordless digital communication technology, etc. The communication channel 140 may be commonly assigned to CPE devices of a call-receiving customer premise or may comprise a plurality of communication channels, where each CPE device has an individual communication channel to communicate with the data relay device 120 of the call-receiving customer premise.

When an incoming call is received by the data relay device 120 of a customer premise, the data relay device 120 determines whether the incoming call has a matching or corresponding record in a database of one or more user profiles of the customer premise. The incoming call may be any reasonably suitable call such as a voice call, a fax transmission, etc., and information received with the incoming call may be any reasonably suitable information received with the incoming call such as a caller identification, content of the incoming call, a time of the call, etc.

The data relay device 120 of the call-receiving customer premise may have a database storing a profile for each user of the customer premise. Each user's profile may be used in determining different ring tones to be played by appropriate CPE devices 111 of the call-receiving customer premise. For instance, when a call is received by the data relay device 120 of a customer premise, the data relay device 120 may search through all of the user profiles in the data relay device 120 and find records matching or corresponding to information of the incoming call. Each profile may also have a list of actions to be performed based on information of the incoming call. For instance, a profile may instruct a CPE device 111 to play a customized ring tone for a particular caller, play a ring tone with a reduced volume after a certain time at night, etc.

The matching or corresponding records of a call-receiving customer premise may have information as to ring tones to be played by appropriate CPE devices 111 of the call-receiving customer premise for incoming calls. The information as to the ring tones to be played by appropriate CPE devices 111 of the call-receiving customer premise may comprise any reasonably suitable information for retrieving the ring tones such as names of the ringtones, addresses of locations in the network 105 where the ring tones may be found, a description of the ringtones with which search queries may be made to the network 105 for finding the ringtones, etc.

If there is at least one matching or corresponding record in one or more user profiles, the data relay device 120 obtains ring tones identified in the matching or corresponding records from the one or more media providers 101 through the network 105 and communicates the ring tones and instructions to play the ring tones as ring tones to appropriate CPE devices 111. Each instruction may instruct the respective CPE device 111 to pick up a ring tone and play the ring tone out of a speaker phone of the CPE device 111. The instruction from the data relay device 120 may indicate the precise frame(s) of the communication channel 140 of the CPE device 111 at which the ring tone may be communicated to the respective CPE device 111 or may instruct the CPE device 111 to turn on the speaker phone and leave the communication channel 140 of the CPE device 111 open so that when the ring tone is communicated by the data relay device 120, the ring tone may be played out of the speaker phone. The ring tone may be communicated to a respective CPE device 111 at the same time that the instruction to play the ring tone as a ring tone of the CPE device 111 is communicated by the data relay device 120 or subsequently.

If there is no matching or corresponding record in user profiles to the incoming call, the data relay device 120 of the call-receiving customer premise may instruct the respective CPE devices 111 of the call-receiving customer premise to play generic ring tones. While the generic ring tones may be stored at the data relay device 120 for being played each time the generic ring tones are to be played, an alternative method is to have one or more generic ring tones to be fetched each time an incoming call is received by the data relay device 120 through the network 105 and communicated to the appropriate CPE devices 111 without necessarily having the generic ring tones being stored in the data relay device 120.

CPE devices 111 may be any reasonably suitable CPE devices for receiving an incoming call such as a telephone, a fax machine, a computer, etc. In response to receiving from the data relay device 120 of the call-receiving customer premise an instruction to pick up a ring tone, a respective CPE device 111 may pick up the ring tone at a designated frame of the communication channel 140 or turn on the speaker phone and indicate to the base station to transmit the ring tone. When the ring tone comes over, the respective CPE device 111 may recognize and treat the ring tone received from the base station as a ring tone. In receiving incoming telephone calls, if the user wishes to receive the incoming call using an ear piece, the speakerphone is disabled. If the user wishes to receive the incoming call using the speakerphone, the speakerphone remains enabled, and the telephony path is established.

CPE devices 111 of the call-receiving customer premise may treat ring tones received from the data relay device 120 of the call-receiving customer premise differently from other information received from the data relay device 120 of the call-receiving customer premise. For instance, actual call content may be played out of an ear piece unless a speaker mode is chosen by a user, whereas ring tones may be played out of a speaker phone. Further, when actual call content is being played at a CPE device 111, pressing a "send" button may not change a status of a call on the CPE device 111, whereas the same action performed during a play of a ring tone connects a call. During a play by an appropriate CPE device 111 of a ringtone received from the data relay device 120 of the call-receiving customer premise, a user of the CPE device 111 may receive the call by, for example, picking up the phone from a phone base or by pressing a "send" button, at which time the audio streaming of the ring tone from the data relay device 120 ceases and is replaced with a telephony speech from the caller.

Figure 2:
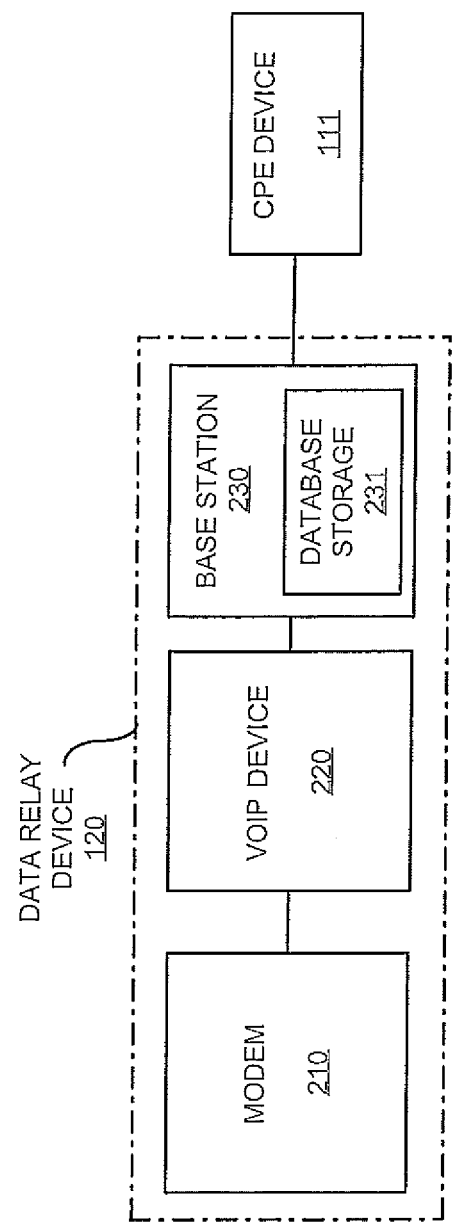
FIG. 2 illustrates a block diagram of a data relay device configured to provide a ring tone based on information of an incoming call, according to an embodiment of the invention.

Turning now to FIG. 2, shown therein is a block diagram of a data relay device 120 for providing a ring tone based on information of an incoming call, according to an embodiment. The data relay device 120 comprises a modem 210, a VoIP device 220, and a base station 230. It should be understood that the data relay device 120 may include additional components and that some of the components described herein may be removed and/or modified without departing from a scope of the data relay device 120. For example, while the modem 210, VoIP device 220, and base station 230 are shown as separate components of the data relay device 120, different component make-ups may also be used, and any one or more functions of any one or more components may be replaced by functions in other components. Further, the components of the data relay device 120 may be in a single housing or in multiple housings.

The modem 210 may be any reasonably suitable modem, where the modem 210 receives data packets from the network 105 corresponding to incoming calls and communicates the data packets to the VoIP device 220. Further, the modem 210, when instructed by the VoIP device 220 and/or the base station 230, obtains ring tones from appropriate one or more media providers 101 and provides data packets corresponding to the ring tones to the VoIP device 220.

The VoIP device 220 may be any reasonably suitable VoIP device and converts data packets received from the modem 210 to audio signals by at least stripping header fields from the data packets before communicating the converted audio signals to the base station 230 and converts audio signals received from the base station 230 to data packets by at least adding header fields before outputting the converted data packets to the modem 210. Further, the VoIP device 220, when instructed by the base station 230 to obtain ring tones from appropriate media providers 101, instructs the modem 210 to obtain the ring tones and, when the ring tones are obtained by the modem 210, converts data packets corresponding to the ring tones to audio signals by at least stripping header fields from the data packets before communicating the converted audio signals to the base station 230. The converted audio signals may be a pure pulse-code modulated stream of data corresponding to the ring tones.

The base station 230 may have a database storage 231 for storing user profiles of CPE devices 111 and for determining records corresponding to caller identifications as described above. The base station 230 may be any reasonably suitable base station for communicating converted audio signals received from the VoIP device 220 to CPE devices 111 of the respective customer premise and receiving audio signals from the CPE devices 111 based on any reasonably suitable communication standard such as the DECT standard, another cordless digital communication technology, etc. The base station 230 may perform any one or more of the above-described functions of the data relay device 120 in determining a ring tone based on information of an incoming call, obtaining any necessary ring tones from the network 105, instructing appropriate CPE devices 111 to play either generic or customized ring tones, etc. Alternatively, some of the functions may be distributed to the modem 210, the VoIP device 220, and any other components (not shown) of the data relay device 120. For example, a database of user profiles described above may be stored in a database storage outside the base station 230 but may be controlled by the base station 230 in determining whether one or more records of the database matches or corresponds to information of the incoming call.

Figure 3:
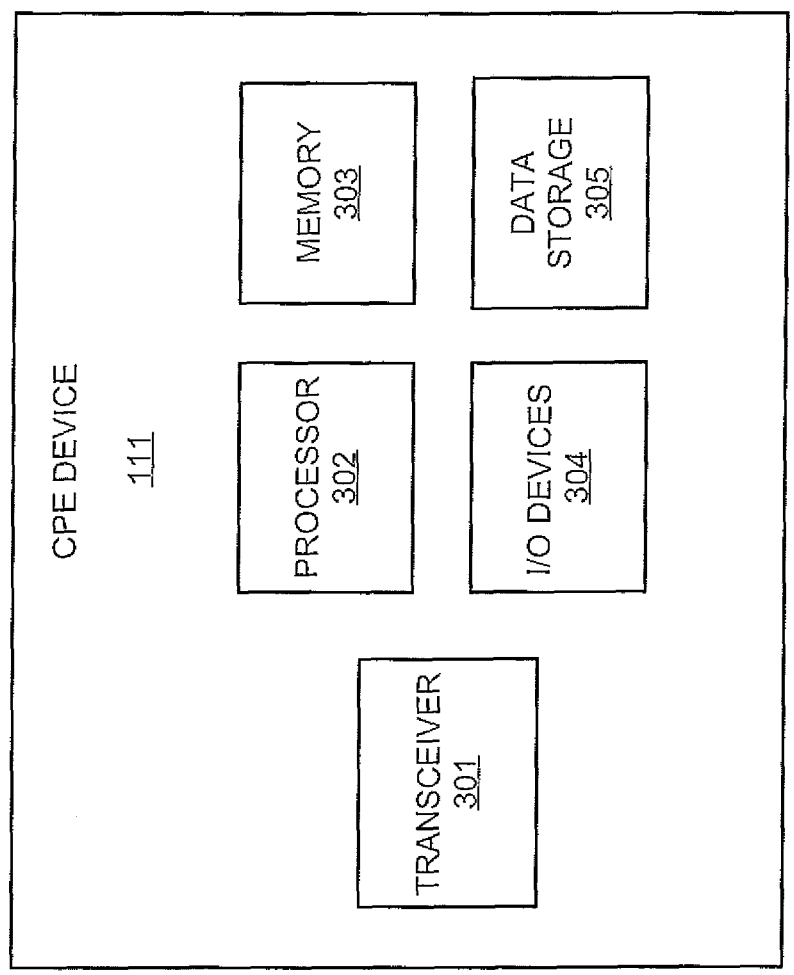
FIG. 3 illustrates a block diagram of a CPE device according to an embodiment of the invention.

FIG. 3 illustrates a block diagram of a CPE device 111 according to an embodiment. It should be understood that the CPE device 111 may include additional components and that some of the components described herein may be removed and/or modified without departing from a scope of the CPE device 111.

The CPE device 111 includes a transceiver 301, a processor 302, a memory 303, I/O devices 304, and a data storage 305. The CPE device 111 may include other features as is known in the art. The transceiver 301 communicates with the base station 230 of a respective data relay device 120 in connecting calls and receiving ring tones. According to an embodiment, the processor 302 is operable to control operations of the CPE device 111 and execute instructions from the base station 230 of the respective data relay device 120 including instructions to receive a ring tone, play a manual ring tone, play a customized ring tone, etc. The I/O devices 304 may include a speaker, a display, a handset, etc., and plays the manual or customized ring tone in response to the processor 302. The memory 303 may store software executed by the processor 302. A data storage 305 of the CPE device 111 may store one or more manual ring tones to be played in response to an instruction from the base station 230 of the respective data relay device 120 to play a manual ring tone.

Turning now to FIG. 4, illustrated therein is a flow-chart of a method 400 for obtaining from the network 105 media related to an incoming call according to an embodiment. It should be apparent to those of ordinary skill in the art that other steps may be added or existing steps may be removed, modified or rearranged without departing from a scope of the method 400.

At step 401, an incoming call is received at the data relay device 120.

At step 402, a determination is made whether the incoming call has a corresponding record such as, for instance, a caller identification, at the data relay device 120.

At step 403, if a corresponding record exists, the data relay device 120 obtains customized media such as, for example, a ring tone, based on the corresponding record through a network 105.

At step 404, the data relay device 120 transmits the customized media to a CPE device 111.

At step 405, the CPE device 111 plays the customized media to inform a user of the incoming call.

At step 406, if a corresponding record does not exist, the data relay device 120 transmits an instruction to the CPE device 111 to play generic media to inform a user of the incoming call.

At step 407, the CPE device 111 plays the generic media to inform a user of the incoming call.

Customized ring tones for different callers may be obtained by the data relay device 120 of the call-receiving customer premise by using the connection of the data relay device 120 to the network 105, where the customized ring tones may be obtained from the Internet or a local area network (LAN) and provided to appropriate CPE devices 111 for being played by the CPE devices for informing users of incoming calls and enabling a differentiation between different callers by the ring tones.

Any one or more of the above described operations of obtaining from the network 105 media related to an incoming call in reference to exemplary features and embodiments of FIGS. 1-4 may be contained as a computer program product embodied on one or more tangible, computer readable storage mediums. By implementing in a computer program product the above described operations of obtaining from the network 105 media related to an incoming call in reference to exemplary features and embodiments of FIGS. 1-4, hardware changes may be obviated, and, thus, existing VoIP devices may be used with software updates (for instance, by downloading software updates to VoIP devices through a network) implementing any appropriate changes. The computer program product may exist in a variety of forms both active and inactive. For example, the computer program product may exist as software program(s) comprised of program instructions in source code, object code, executable code or other formats whether compressed or uncompressed.

Exemplary tangible, computer readable mediums include conventional computer system RAM, ROM, EPROM, EEPROM, and magnetic or optical disks or tapes. Concrete examples of the foregoing include distribution of the programs on a CD ROM or via Internet download. In a sense, the Internet itself, as an abstract entity, is a computer readable medium. The same is true of computer networks in general.

While exemplary features and embodiments of FIGS. 1-4 have been explained within the context of each feature and embodiment, any one or more of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A data relay device for obtaining, from a network, media related to an incoming call, the data relay device comprising:
    a modem connected to the network and configured to receive the incoming call in data packets;
    an adaptor connected to the modem and configured to:
        at least strip header fields of the data packets in producing an output, and
        obtain the media from the network; and
    a base station connected to the adaptor and configured to:
        determine whether the incoming call has a corresponding record in one or more records of the data relay device,
        obtain the media obtained from the network by the adaptor from the output of the adaptor using the corresponding record in response to a determination that the incoming call has the corresponding record in the one or more records of the data relay device, wherein the media obtained from the network by the adaptor and obtained from the output of the adaptor comprises at least a customized ringtone that corresponds to a caller from which the incoming call is received, and
        transmit the media obtained from the network by the adaptor and obtained from the output of the adaptor to the customer premise equipment device,
    wherein the adaptor and the modem are further configured to obtain the media from the network in response to an instruction from the base station to obtain the media.

2. The data relay device of claim 1, wherein the adaptor is further configured to convert audio signals received from the customer premise equipment device into data packets by at least adding header fields.

3. The data relay device of claim 1, wherein the one or more records of the data relay device comprise a plurality of records each having a caller identification and at least one of an identification or a location of corresponding media to be played by the customer premise equipment device to inform a user of the incoming call, and the base station is further configured to determine whether the incoming call has the corresponding record based on a caller identification of the incoming call.

4. The data relay device of claim 1, wherein the base station is further configured to send an instruction to the customer premise equipment device to play another media stored at the customer premise equipment device after determining that the information corresponds to none of the one or more records of the data relay device.

5. A method of obtaining from a network media related to an incoming call, the method comprising:
    after receiving the incoming call at a data relay device, determining by the data relay device whether the incoming call corresponds to at least one of one or more records stored at the data relay device;
    after determining that the incoming call corresponds to at least one of the one or more records stored at the data relay device, obtaining at the data relay device the media based on the at least one record through the network in response to a determination that the incoming call corresponds to the at least one record, wherein the media comprises at least a customized ringtone that corresponds to a caller from which the incoming call is received; and
    transmitting the media obtained through the network from the data relay device to the customer premise equipment device.

6. The method of claim 5, wherein the data relay device comprises a modem configured to receive the incoming call in data packets each comprising a header field and a data field, an adaptor coupled to the modem and configured to at least strip the header fields of the data packets in producing an output, and a base station coupled to the adaptor and configured to transmit the output of the adaptor to the customer premise equipment device.

7. The method of claim 6, wherein the adaptor is configured to convert audio signals received from the customer premise equipment device into data packets by at least adding header fields.

8. The method of claim 5, wherein the one or more records stored at the data relay device comprise a plurality of records each having a caller identification and corresponding media to be played to inform a user of the incoming call and determining whether the incoming call has at least corresponding record stored at the data relay device is performed based on a caller identification of the incoming call.

9. The method of claim 5, wherein obtaining the media through the network comprises receiving from the network data packets corresponding to the media, wherein each of the data packets includes a header field and a data field.

10. The method of claim 5, further comprising playing the media at the customer premise equipment device without having the media stored at the customer premise equipment device.

11. The method of claim 5, further comprising sending an instruction by the data relay device to the customer premise equipment device to play another media stored at the customer premise equipment device after determining that the incoming call corresponds to none of the one or more records stored at the data relay device.

12. A computer program product embodied on one or more non-transitory computer readable storage mediums for obtaining, from a network, media related to an incoming call, the computer program product comprising instructions for:

after receiving the incoming call at a data relay device, determining by the data relay device whether the incoming call corresponds to at least one of one or more records stored at the data relay device;

after determining that the incoming call corresponds to at least one of the one or more records stored at the data relay device, obtaining at the data relay device the media based on the at least one record through the network in response to a determination that the incoming call corresponds to the at least one record, wherein the media comprises at least a customized ringtone that corresponds to a caller from which the incoming call is received; and transmitting the media obtained through the network from the data relay device to the customer premise equipment device.

13. The computer program product embodied on the one or more non-transitory computer readable storage mediums of claim 12, wherein the one or more records stored at the data relay device comprise a plurality of records each having a caller identification and corresponding media to be played to inform a user of the incoming call and determining whether the incoming call has at least corresponding record stored at the data relay device is performed based on a caller identification of the incoming call.

\* \* \* \* \*